US005145693A

United States Patent [19]

Hinzpeter et al.

[11] Patent Number: 5,145,693

[45] Date of Patent: Sep. 8, 1992

[54] ARRANGEMENT FOR MONITORING PRESSING FORCES IN A PELLETIZING MACHINE

[75] Inventors: Jürgen Hinzpeter; Ingo Schmidt; Heinrich Behrmann, all of Schwarzenbek; Jörg Reitberger, Hamburg; Klaus-Peter Preuss, Mölln, all of Fed. Rep. of Germany

[73] Assignee: Firma Wilhelm Fette GmbH, Schwarzenbek, Fed. Rep. of Germany

[21] Appl. No.: 611,176

[22] Filed: Nov. 8, 1990

[30] Foreign Application Priority Data

Dec. 2, 1989 [DE] Fed. Rep. of Germany ....... 3939956

[51] Int. Cl.[5] .............................................. B29C 43/08

[52] U.S. Cl. .................................. 425/149; 264/40.2; 264/40.5; 264/109; 425/345; 425/353

[58] Field of Search ..................... 264/40.2, 40.5, 109, 264/40.1; 425/149, 352, 353, 345

[56] References Cited

U.S. PATENT DOCUMENTS

| | | | |
|---|---|---|---|
| 4,030,868 | 6/1977 | Williams | 425/149 |
| 4,062,914 | 12/1977 | Hinzpeter | 264/40.1 |
| 4,100,598 | 7/1978 | Stiel et al. | 364/476 |
| 4,121,289 | 10/1978 | Stiel | 364/552 |
| 4,253,811 | 3/1981 | Hinzpeter et al. | 425/149 |
| 4,570,229 | 2/1986 | Breen et al. | 364/476 |
| 4,817,006 | 3/1989 | Lewis | 364/476 |

FOREIGN PATENT DOCUMENTS 2824547 12/1979 Fed. Rep. of Germany .

*Primary Examiner*—Mary Lynn Theisen
*Attorney, Agent, or Firm*—Michael J. Striker

[57] ABSTRACT

A method of monitoring maximum pressing forces of a pelletizing machine provided with a rotatable matrix disc and plungers, involves the steps of supplying values corresponding to pressing forces applied by plungers for evaluation in a computer so as to control a deviating device, detecting a position of the matrix disc continuously by an angle pulse transmitter and releasing pulses by the latter to supply the pulses to the computer, and coordinating the pulses with predetermined maximum pressing force values and supplying to evaluation. The pelletizing machine has a rotatable matrix disc, plungers whose maximum pressing forces are supplied for evaluation, a computer to which the maximum pressing forces of the plungers are supplied for evaluation, and an angle pulse transmitter supplying pulses released by the matrix disc during its rotation into the computer for an association to measured maximum pressing forces.

8 Claims, 4 Drawing Sheets

ARRANGEMENT FOR MONITORING PRESSING FORCES IN A PELLETIZING MACHINE

BACKGROUND OF THE INVENTION

The present invention relates to a method of and an arrangement for monitoring maximum pressing forces in a pelletizing machine which has a rotatable matrix disc and plungers whose maximum pressing forces are applied for further evaluation to a computer, the computer controls a setting out deflector for defective pellets.

For insuring a predetermined quality of pellets during their manufacture, pressing forces are continuously monitored during the manufacture and compared with nominal values. If a measured maximum pressing force is outside of the nominal value limit, a corresponding pellet is sorted out. This is performed by actuation of a sorting out deviced located behind a pressing station and particularly behind the main pressing station associated with a prepressing station. The maximum pressing forces of at least the pressing rollers of the main pressing station are measured and evaluated. In view of the high circumferential speed of the matrix disc, the evaluation of the measuring results is performed by a computer, to which the measured pressing force values are supplied. Moreover, it is necessary to supply these signals in the computer, which correspond to the respective position of associated matrix opening or the corresponding plunger during circulation of the matrix disc, for associating an error in the manufacture of the pellets with a corresponding plunger pair, in order to further evaluate the meaning results.

A monitoring of the pressing forces during the manufacture of the pellets is not only required for detecting an error and sorting out of defective pellets but also for monitoring the quality of the produced tablets and to obtain at a later time the information whether the produced tablets correspond to the required quality by determination that the manufacture is performed with a predetermined pressing force. The computer can provide for a continuous control and indication of the measuring results as well as the value of occurring errors.

In order to associate measured maximum pressing forces with the plungers at which they occur, it is known to arrange a plunger proximate switch as a measuring transmitter on the matrix disc, as disclosed in the German document DE-A 2,824,547. It shows the time of each individual pressing force value, at which the maximum pressing force is reached. This is a proximity switch which releases a switching pulse when for example a metal part passes in front of an electrical field. With a matrix disc having for example 30 matrix openings, 30 pulses are therefore released per single revolution and supplied to the computer. A second plunger proximity switch formed as a measuring transmitter is associated in the known pelletizing machine with the above mentioned plunger proximity switch. The pulse length of the second proximity switch is independent from the circumferential speed or the number of revolutions of matrix disc so that an exact determination of the position of the plunger during rotation of the matrix disc at each time point is possible through the computer.

The utilization of the known plunger proximity switch is however not satisfactory when in a pelletizing machine a matrix disc with a predetermined plunger pitch such for example with 30 plungers must be exchanged with another plunger pitch, such as for example 24 matrix openings, or another matrix disc with the same plunger pitch but another property of the matrix openings must be installed for producing bigger or smaller pellets. In the case of such exchangeability of the matrix disc of a pelletizing machine, it is required usually that different products on the same machine can be produced with simple conversion. Since during the production of bigger tablets other matrix openings and correspondingly other plungers are needed then in the case of producing smaller pellets, a smaller number of matrix openings distributed over the periphery of the matrix disc and thereby another number of the plungers is needed. The computation can be performed with the use of predetermined plunger proximity switch with considerable expenses since with a change in the plunger pitch a complete conversion of the approximate switch is required and cannot be performed by operational personnel.

SUMMARY OF THE INVENTION

Accordingly, it is an object of the present invention to provide a method of and an arrangement for monitoring maximum pressing forces, which allows an exchange of a matrix disc by another matrix disc without converting an electronic device for detecting the position of individual plunger or the matrix disc for further evaluation of the measured maximum pressing forces.

In keeping with these objects and with other which will become apparent hereinafter, one feature of the present invention resides, briefly stated, in a method in accordance with which the position of the matrix disc is continuously detected with an angle pulse transmitter by supplying pulses to a computer, and the computer associates the pulses with predetermined maximum pressure force values for a further evaluation.

An angle pulse transmitter is a conventional measuring value transmitter for as an inductive pulse transmitter on magnetic basis or on optical basis with the use of light diodes or photoelectric cells. It can be designed so that the angle pulse transmitter can simultaneously produce several independent pulses. Three individual pulse transmitters can be provided for example, and arranged in a housing or a measuring value transmitter.

The essential advantage of the angle pulse transmitter is that the position of a matrix disc and thereby the plunger associated with it can be continuously measured during the location, independently on the plunger pitch or number of the matrix openings of the respective message disc. This is only the case when the signal transmitter for the angle pulse transmitter is connected with the drive of the matrix disc, so that it does not have to be exchanged during exchange of matrix disc with another.

In accordance with the present invention, the signal transmitter is a coded disc when for example is arranged on the drive shaft of the matrix disc and the coding can be performed for example by a line marking. For one revolution of a matrix disc, for example 3,600 pulses can be released so that with the plunger pitch of 30, or b 30 matrix openings arranged over the periphery of the matrix disc, 120 pulses are released for passage for each plunger. With consideration of the circumferential speed of the matrix disc, due to evaluation by the computer, an association to the independently measured maximum force values is possible. The peripheral speed to be taken into consideration can be determined with the same angle pulse transmitter, when the disc or single transmitter is provided with a mark for generating a special pulse during each revolution of the matrix disc.

Since the maximum pressing forces to be evaluated are produced by the pressure rollers of the stationary main pressing station, it is advantageous to select the location of the main pressing rollers as a reference point or as a zero graduation point, and then to orient the angle pulse transmitter with the associated signal disc. When one matrix is replaced by another, the angle pulses generator must be adjusted since its measuring results are in dependence on the position of the stationary main pressing station or in dependence on the property of the matrix disc.

The novel features which are considered as characteristic for the invention are set forth in particular in the appended claims. The invention itself, however, both as to its construction and its method of operation, together with additional objects and advantages thereof, will be best understood from the following description of specific embodiments when read in conjunction with the accompanying drawings.

DESCRIPTION OF THE PREFERRED EMBODIMENTS

Figure 1:
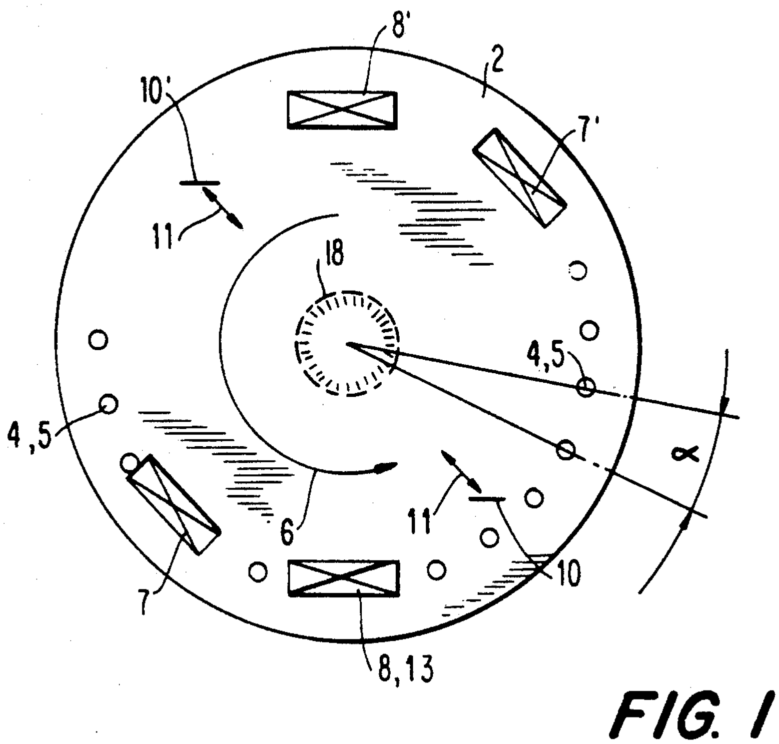
FIG. 1 is a plan view of a matrix disc of a pelletizing machine in accordance with the present invention.
Figure 2:
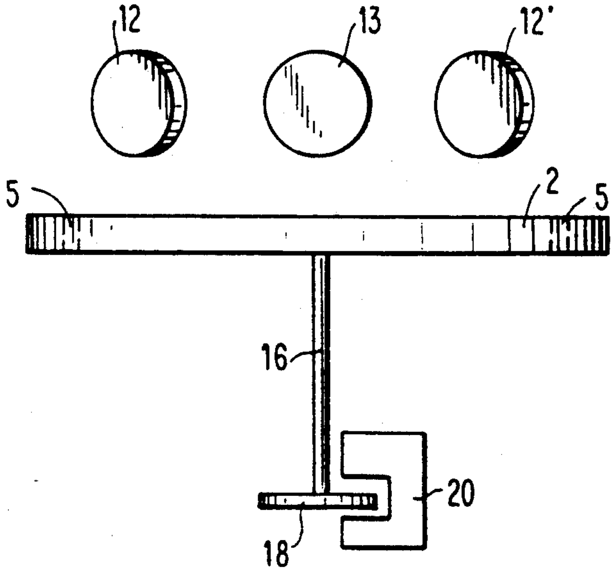
FIG. 2 is a side view of a matrix disc with an angle pulse transmitter.

A matrix disc which is schematically shown in the drawings and identified with reference numeral 2 is provided with 24 matrix openings 5 uniformly distributed over the periphery. A plunger 4 is associated with the matrix disc and has a plunger pitch $\alpha=15°$. The matrix disc 2 is a component of a high power pelletizing machine which is formed as a so-called double rotor and has two main pressing stations 8 and 8' and prepressing stations 7 and 7' located before the pressing station. As considered in the rotary direction of the matrix disc in counterclockwise direction corresponding to the arrow 6, sorting out deflectors 10 and 10' are located behind the main pressing stations and can be displaced in direction of the double arrow 11 when a defective pellet must be separated. With the exception of the movability of the deflectors 10 and 10', the processing stations 7 and 7' as well as the main pressing stations 8 and 8' and the sorting out deflectors 10 and 10' are arranged stationarily, while the matrix disc 2 with the matrix openings 5 and the plunger 4 rotate during the operation.

Figure 7:
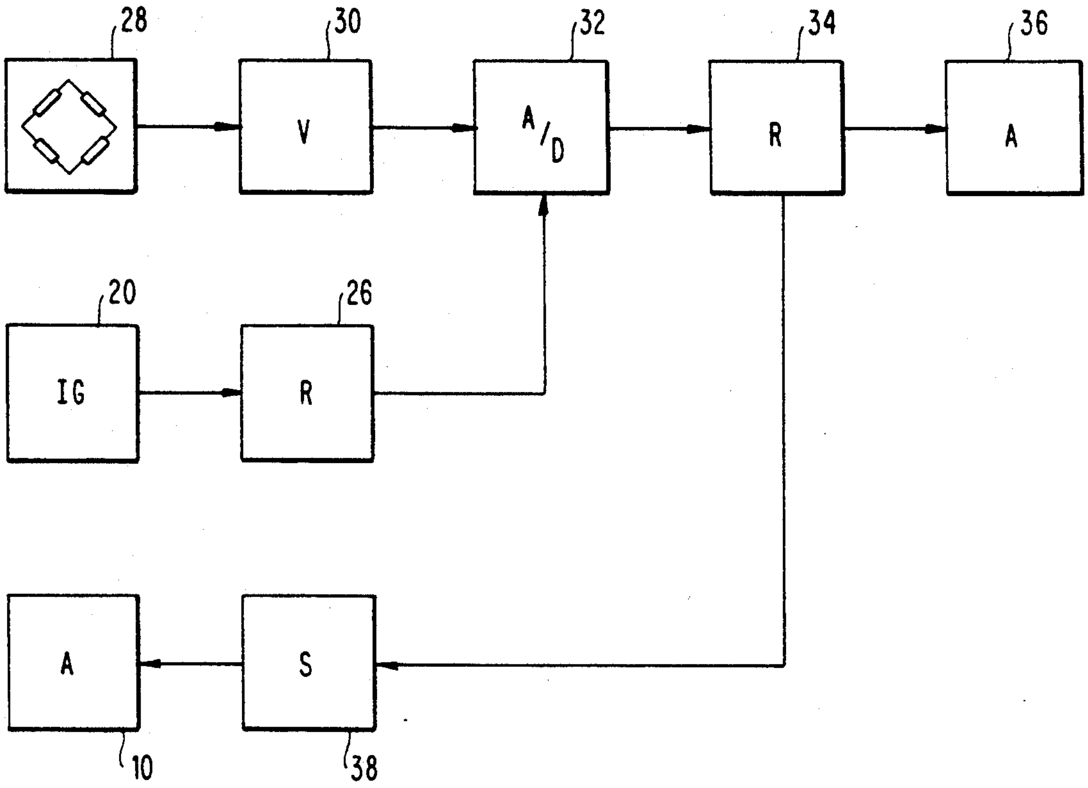
FIG. 7 is a block diagram of the inventive method and arrangement.

In order to produce an individual pellet, powder is first prepressed by pressing rollers 12 and 12' in the prepressing stations 7 and 7', and then pressed by maximum pressing force with pressing rollers 13 in the main pressing station 8 and 8'. The pressing forces used for this are continuously measured with the utilization of wire strain gauges at a measuring location 28 shown in FIG. 7. An amplifier 30 is arranged after the measuring location 28 and transmits the signal through an analog-digital converter 32 to a computer 34 formed as a pressure force monitoring unit. The latter compares the detected pressure force signals with nominal value limits by electronic processing. The computer 34 in FIG. 7 can control a control unit 38 for the sorting out deflector 10 for separating a defective pellet.

An angle pulse transmitter 20 is provided for location determination of the respective measured pressing forces which are associated with the released plunger with consideration of the progressing change of its position. The angle pulse transmitter cooperates with a coded disc provided as a signal transmitter for example with a line marking. During a rotation of the matrix disc for example 3,600 pulses are released so that on each plunger during one passage through a main pressing station 150 pulses are supplied. The signal disc 18 is arrange on a drive shaft 16 of the matrix disc 2. With each revolution of the matrix disc, it turns on time completely, independently on the special properties of the matrix disc, or in other words is operative independently on which plunger pitch for the matrix disc is provided.

Figure 3:
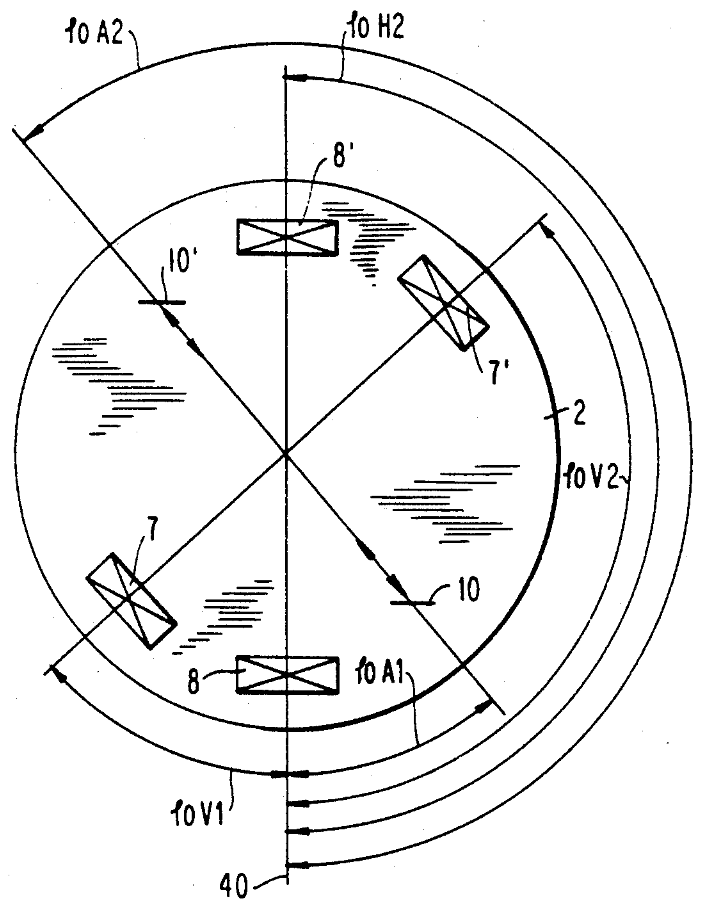
FIG. 3 is a view showing the matrix disc with angular portions.

Since the pulses produced by the pulse transmitter 20 as representation for the angular position of the matrix disc 2 are to be coordinated with the independently measured pressing force values in the computer, it is logical to orient, to adjust or to direct the pulse transmitter 20 in accordance with the location at which maximum pressing forces are applied. This is the location at which the pressure rollers 13 of the main pressing station 8 are located. If this location in correspondence with FIG. 3 is considered as a reference point or an initial position, then the sorting out deflector 10 forms a stationary angle $\phi$ 0A1, the second prepressing station 7' forms an angle $\phi$ 0V2, the second main pressing station 8' forms an angle $\phi$ 0H2, the second sorting out deflector 10' forms an angle $\phi$ 0A2, while the first prepressing station 7 forms an angle $\phi$ 0V1 relative to a zero position.

Figure 4:
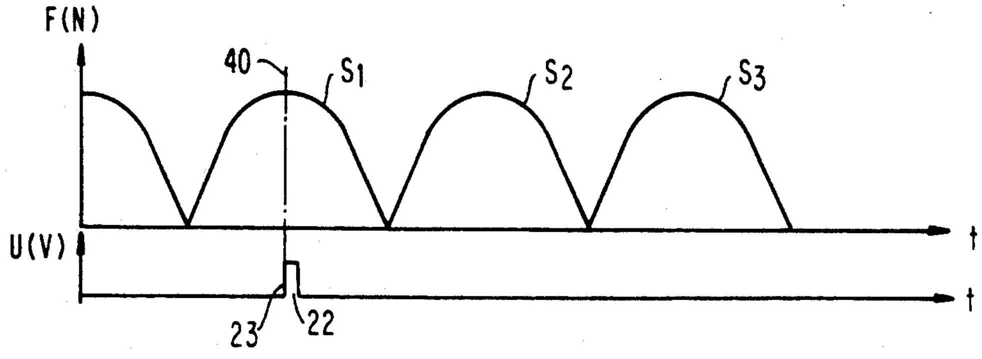
FIG. 4 is a view showing a diagram of a pressing force and an initial pulse.

When the signal disc is provided with a marking which released during each revolution only one pulse identified as a circumferential pulse or a rotation pulse, it is advantageous to release this pulse when the marking passes through the initial position zero, or in other words, at the time in which a maximum pressing force is applied in the main station 8 by a plunger. A corresponding showing is presented in FIG. 4, in which the pressing force course for the plungers S1, S2, S3 is shown in the upper diagram, while the showing below represents the circumferential pulse 22 with a switching flank 23 located in correspondence with a line 40 in condition of pressing force maximum of the plunger S1.

Figure 5:
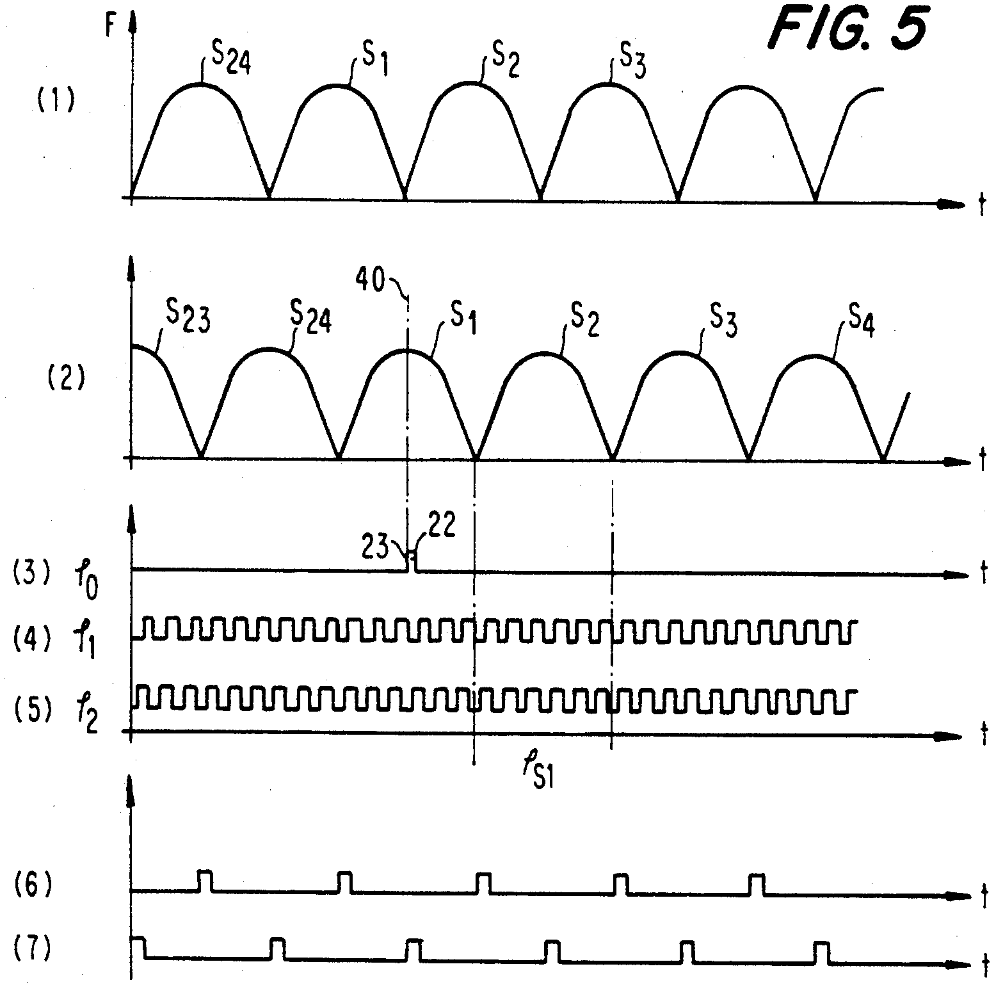
FIG. 5 is a view showing a diagram of pressure forces and released pulse in a time sequence.

The course of the curves is presented with respect to time, while the ordinate in one case shown the force F measured in Newton (N) and in another case the voltage U measured in volt (V). For an adjustment or regulation, the pressing force of the plunger S1 is measured in the main pressing station 8 and the matrix disc 2 is rotated by hand until the maximum pressing force is reached. In this position the signal disc 18 is adjusted so that with the switching flank 23 of the circumferential pulse 24 and the marking provided for it on the disc 18, a pulse is released. After this a coordination of the released pulses with the independently measured pressing forces is provided, as shown in FIG. 5. It should be emphasized that this showing deals only with the condition which occurs in the main pressing station 8 and the prepressing station 7. In addition to it and simultaneously, pulse rows can be released with the same pulse transmitter 20 and associated with the pressing forces which are detected in the second prepressing station 7' and main pressing station 8'.

Figure 6:
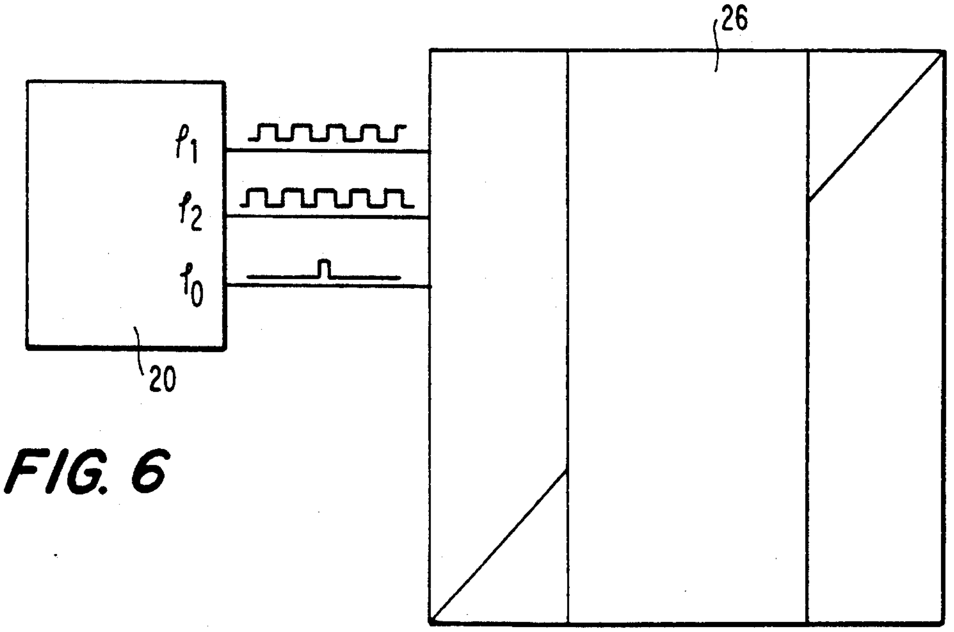
FIG. 6 is a view schematically showing a computer with an input and an output.

In FIG. 5 the curve 1 shows the pressing force course in the prepressing station 7 and the curve 2 shows the pressing force course in the main pressing station 8 over the time t. It can be seen that the maximum pressing force of the plunger S1 is measured at a later time point in the main pressing station 8, then in the pressing station 7. The maximum of the pressing force of the plunger S1 is located in correspondence with the curve 2 on the zero line 40, on which the switching flank 23 of the circumferential pulse 22 is located by the respective adjustment of the signal disc 18. The pulse chain lie underneath with the curves 4 and 5 and identified as $\phi$ 1 and $\phi$ 2 and associated with the main pressing station 8 and the prepressing station 7., These pulse chains over the curves 4, 5 deal with such pulses which are supplied from the pulse transmitter 20 directly into the first computer 26 shown in FIG. 7 in correspondence with FIG. 6. The computer 26 converts the signals to the curves 6 and 7 corresponding to the initial signals, for the prepressing and main pressing station. The pulses are spaced relative to one another in correspondence with the plunger pitch $\phi$ S1 mounted on the curves 2, 3, 4 and 5.

The pulses corresponding to the curves 6 and 7 are supplied parallel to the measured pressing forces in a second computer 34 through an analog-digital converter 32, so that by a clearing an interrogation of the prepressure in the main pressure of individual plunger is possible. It is also in the double rotor machines with consideration of the two pressing stations, a control of the sorting out deflector 10 and an output of the resulting form of marking or through an indicator 36 is possible.

The above presented description deals with the utilization of two computers 26 and 34, however it is not limited to two computers. There is also the possibility to use instead of two computers 26 and 34 a further computer or to use just a single computer.

It will be understood that each of the elements described above, or two or more together, may also find a useful application in other types of constructions differing from the types described above.

While the invention has been illustrated and described as embodied in a method of and an arrangement for monitoring pressing forces of a pelletizing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letter Patent is set forth in the appended claims.

We claim:

1. A pelletizing machine, comprising a rotatable matrix disc; plungers whose maximum pressing forces are supplied for evaluation; and a computer to which the maximum pressing forces of the plungers are supplied for evaluation; and angle pulse transmitter supplying pulses released by the matrix disc during its rotation into said computer for an association to measured maximum pressing forces, said matrix disc being provided with a drive, said drive being provided with a coded signal transmitter for said angle pulse transmitter.

2. A pelletizing machine as defined in claim 1, wherein said coded signal transmitter is formed as a disc provided with coding.

3. A pelletizing machine as defined in claim 1, wherein said coded signal transmitter is arranged exchangeably.

4. A pelletizing machine as defined in claim 1, wherein said coded signal transmitter is arranged displaceably.

5. A pelletizing machine, comprising a rotatable matrix disc; plungers whose maximum pressing forces are supplied for evaluation; and a computer to which the maximum pressing forces of the plungers are supplied for evaluation; an angle pulse transmitter supplying pulses released by the matrix disc during its rotation into said computer for an association to measured maximum pressing forces, said angle pulse transmitter being connected with said computer; and a second computer to which said first mentioned computer supplies corrected signals and in which additionally maximum determined pressing force values are supplied, said matrix disc being provided with a drive, said drive being provided with a coded signal transmitter for said angle pulse transmitter.

6. A pelletizing machine as defined in claim 1, wherein said coded signal transmitter is formed as a disc provided with a coding.

7. A pelletizing machine as defined in claim 1, wherein said coded signal transmitter is arranged exchangeably.

8. A pelletizing machine as defined in claim 1, wherein said coded signal transmitter is arranged displaceably.

* * * * *